(12) United States Patent
Uchiyama (10) Patent No.: US 10,479,679 B2
(45) Date of Patent: Nov. 19, 2019

(54) EXHAUST GAS CLEAN-UP SYSTEM EQUIPPED WITH POWER GENERATING FUNCTION

(71) Applicant: ATSUMITEC CO., LTD., Shizuoka (JP)

(72) Inventor: Naoki Uchiyama, Shizuoka (JP)

(73) Assignee: ATSUMITEC CO., LTD., Shizuoka (JP)

( * ) Notice: Subject to any disclaimer, the term of this patent is extended or adjusted under 35 U.S.C. 154(b) by 189 days.

(21) Appl. No.: 15/558,464

(22) PCT Filed: Mar. 4, 2016

(86) PCT No.: PCT/JP2016/056844
§ 371 (c)(1),
(2) Date: Sep. 14, 2017

(87) PCT Pub. No.: WO2016/152464
PCT Pub. Date: Sep. 29, 2016

(65) Prior Publication Data
US 2018/0093885 A1    Apr. 5, 2018

(30) Foreign Application Priority Data
Mar. 23, 2015    (JP) .................. 2015-058976

(51) Int. Cl.
*H01M 8/06* (2016.01)
*H01M 8/04* (2016.01)
(Continued)

(52) U.S. Cl.
CPC ............ *C01B 3/065* (2013.01); *C01B 3/0031* (2013.01); *C01B 3/508* (2013.01); *F01N 3/24* (2013.01);
(Continued)

(58) Field of Classification Search
CPC ........ H01M 8/06; H01M 8/02; H01M 8/0612; H01M 8/04; C01B 3/06; C01B 3/50; C01B 3/00; C01B 3/24
See application file for complete search history.

(56) References Cited

U.S. PATENT DOCUMENTS 5,422,085 A    6/1995 Bell et al.
2003/0175563 A1*    9/2003 Bruck ................. B60L 11/1881
429/421
(Continued)

FOREIGN PATENT DOCUMENTS

CN    102925991 A    2/2013
JP    6-280695 A    10/1994
(Continued)

OTHER PUBLICATIONS

Mahcine translation of: JP 06/280695 A, Ishiko et al., Oct. 4, 1994.*
(Continued)

*Primary Examiner* — Kenneth J Douyette
(74) *Attorney, Agent, or Firm* — Kinney & Lange, P.A.

(57) ABSTRACT

The system comprises a steam reforming unit to produce hydrogen from exhaust gas supplied, a hydrogen permeable membrane to allow only hydrogen produced by the steam reforming unit to pass through it, a hydrogen storage unit to absorb hydrogen supplied through the hydrogen permeable membrane and release absorbed hydrogen, a fuel cell to generate power using hydrogen supplied from the hydrogen storage unit, a gas clean-up unit to clean up residual gases delivered not passing through the hydrogen permeable membrane, and a control unit to control the hydrogen storage unit to absorb or release hydrogen depending on whether the fuel cell is supplied with sufficient hydrogen.

3 Claims, 4 Drawing Sheets

(51) Int. Cl.
*C01B 3/06* (2006.01)
*F01N 3/24* (2006.01)
*C01B 3/00* (2006.01)
*C01B 3/50* (2006.01)
*H01M 8/0612* (2016.01)

(52) U.S. Cl.
CPC ... *H01M 8/0618* (2013.01); *C01B 2203/0233* (2013.01); *C01B 2203/066* (2013.01); *C01B 2203/169* (2013.01)

(56) References Cited

U.S. PATENT DOCUMENTS

| | | |
|---|---|---|
| 2006/0063046 A1 | 3/2006 | Hu et al. |
| 2006/0108160 A1 | 5/2006 | Rogitz |
| 2007/0278795 A1 | 12/2007 | Berkson |
| 2011/0129745 A1 | 6/2011 | Givens et al. |

FOREIGN PATENT DOCUMENTS

| | | |
|---|---|---|
| JP | 2005-276634 A | 10/2005 |
| JP | 2005298260 A | 10/2005 |
| JP | 2006056722 A | 3/2006 |
| JP | 2006-152901 A | 6/2006 |
| JP | 2006-261030 A | 9/2006 |
| JP | 2008-513285 A | 5/2008 |
| JP | 2011137401 A | 7/2011 |

OTHER PUBLICATIONS

Machine Translation of: JP 2006/152901 A, Aoyama et al., Jun. 15, 2006.*
Chinese Office Action dated Sep. 5, 2018, for corresponding Chinese Application No. 201580041952.0.
Extended European Search Report dated Sep. 6, 2018, for corresponding European Application No. 16768367.1.
International Search Report dated May 17, 2016 for corresponding PCT Application No. PCT/JP2016/056844.

* cited by examiner

EXHAUST GAS CLEAN-UP SYSTEM EQUIPPED WITH POWER GENERATING FUNCTION

BACKGROUND

Technical Field

The present invention relates to an exhaust gas clean-up system equipped with a power generating function which cleans up exhaust gas while generating power using exhaust gas.

Background Art

From a recent view point of environmental conservation, in order to reduce harmful substances in exhaust gas discharged from heat engines including internal combustion engines such as those mounted on vehicles and external combustion engines such as those in power generation stations, exhaust gas clean-up systems are known which clean up exhaust gas with an exhaust gas clean-up device such as a catalytic converter arranged in an exhaust gas passage.

For example, exhaust gas from engines such as those mounted on vehicles which burn petroleum fuel such as gasoline or light fuel oil contains, as major harmful substances, carbon monoxide (CO), carbon hydride (HC) and nitrogen oxide ($NO_x$). To cope with them, a three-way catalytic converter comprising precious metals, specifically platinum-group elements such as platinum (Pt), palladium (Pd) and rhodium (Rh) carried on a catalyst support made of heat-resistant oxides, mainly of silica ($SiO_2$), alumina ($Al_2O_3$) and ceria ($CeO_2$) is arranged in an exhaust gas passage of the engine. The three-way catalytic converter cleans up exhaust gas by converting the aforementioned harmful substances into harmless substances such as water ($H_2O$), carbon dioxide ($CO_2$) and nitrogen ($N_2$) by oxidation or reduction.

In lean-burn gasoline engines and diesel engines in which a relatively small amount of fuel is burnt at high temperature and high pressure, the ratio of $NO_x$ emissions to HC and CO emissions is greater. In such engines, a device such as an $NO_x$ absorption reduction catalytic converter carrying alkaline substances capable of absorbing $NO_x$, wherein $NO_x$ is absorbed and then reduced by creating a reduction atmosphere by, for example temporarily increasing fuel injection, or a so-called SCR (Selective Catalytic Reduction) converter, which reduces absorbed $NO_x$ using ammonia ($NH_3$) produced by hydrolysis caused by adding a reductant such as urea water to exhaust gas, is provided in the exhaust gas passage (see Patent Document 1).

Recently, in order to curb emissions of carbon dioxide, hydrogen is attracting attention as an energy source. As a device using hydrogen as an energy source, an SOFC (Solid Oxide Fuel Cell) is known, for example. In order to enable the SOFC to operate efficiently, development of hydrogen generators for supplying hydrogen to the SOFC is being promoted. For example, a fuel cell system is disclosed in which fuel vapor generated in an evaporator is supplied to a hydrogen generator and hydrogen generated in the hydrogen generator is supplied to a fuel cell to generate power (see Patent Document 2).

PRIOR ART DOCUMENT

Patent Document

Patent Document 1: Japanese Patent No. 5376450
Patent Document 2: Japanese Unexamined Patent Application Publication No. 2005-298260

SUMMARY

Only reducing $NO_x$ in exhaust gas as in Patent Document 1 does not mean making effective use of exhaust gas; energy is not utilized sufficiently effectively. Further, the fuel cell system as in Patent Document 2 needs to produce fuel vapor as a fuel source for hydrogen, which prevents the fuel cell system from generating power at low cost and with high efficiency. Furthermore, when supply of fuel vapor serving as a fuel source for hydrogen is difficult, hydrogen cannot be produced, so that the fuel cell cannot generate power. Thus, with the conventional systems, it is not possible to utilize hydrogen energy effectively and efficiently while satisfactorily contributing to environmental conservation.

An object of the present disclosure is to provide an exhaust gas clean-up system equipped with a power generating function which can clean up exhaust gas while generating power using exhaust gas, and which can generate power even when exhaust gas serving as a fuel source for hydrogen is not supplied.

The exhaust gas clean-up system equipped with a power generating function according to the present disclosure comprises a steam reforming unit to produce hydrogen from exhaust gas supplied, a hydrogen permeable membrane to allow only hydrogen produced by the steam reforming unit to pass through it, a hydrogen storage unit to absorb hydrogen supplied through the hydrogen permeable membrane and release absorbed hydrogen, a fuel cell to generate power using hydrogen supplied from the hydrogen storage unit, a gas clean-up unit to clean up residual gases delivered not passing through the hydrogen permeable membrane, and a control unit to control the hydrogen storage unit to absorb or release hydrogen depending on whether the fuel cell is supplied with sufficient hydrogen.

The exhaust gas clean-up system equipped with a power generating function according to the present disclosure can clean up exhaust gas while generating power using exhaust gas, and can generate power even when exhaust gas serving as a fuel source for hydrogen is not supplied.

DETAILED DESCRIPTION

With reference to the drawings, a mode of carrying out the present invention will be described below in detail according to an embodiment. The present invention is not restricted to the described embodiment; it can be embodied with any desired alteration that does not change the essentials thereof. The drawings used in explanation of the embodiment show an exhaust gas clean-up system equipped with a power generating function according to the present invention and its components, schematically; in order to help understanding, they may contain partial emphasis, enlargement, contraction, omission or the like, and thus, may not necessarily show the respective components on an accurate scale and in an accurate shape. Further, numerical values mentioned with regard to the embodiment are all given by way of example; they may be varied as necessary.

<Embodiment>

(Configuration of the Exhaust Gas Clean-Up System Equipped with a Power Generating Function)

Figure 1:
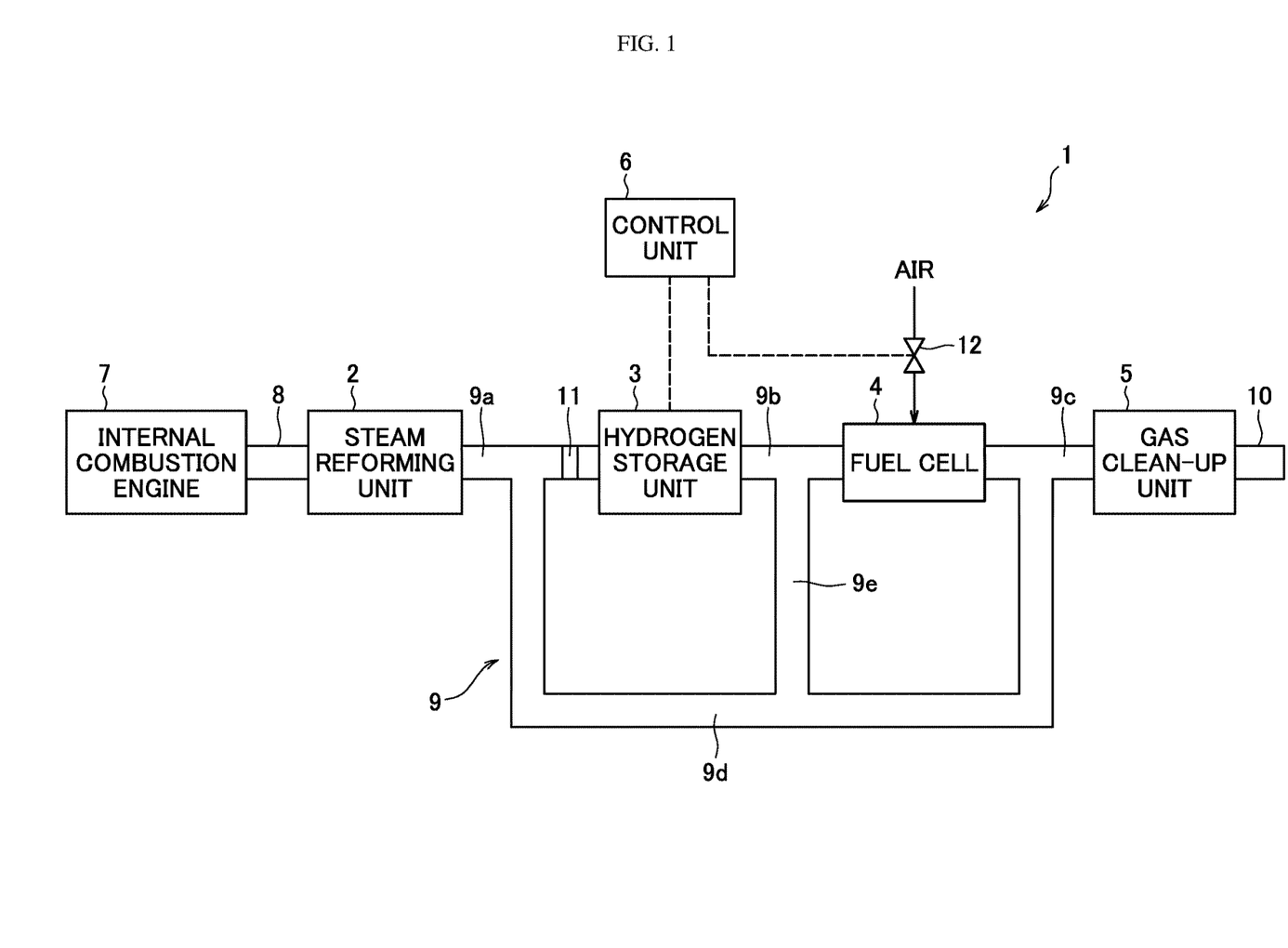
FIG. 1 is a schematic diagram showing the overall configuration of an exhaust gas clean-up system equipped with a power generating function according to an embodiment of the present disclosure.

First, with reference to FIG. 1, configuration of an exhaust gas clean-up system equipped with a power generating function 1 according to an embodiment of the present disclosure will be described. FIG. 1 is a schematic diagram showing the overall configuration of the exhaust gas clean-up system equipped with a power generating function 1 according to the embodiment. Hereinafter, the exhaust gas clean-up system equipped with a power generating function 1 may also be referred to simply as "exhaust gas clean-up system 1".

The exhaust gas clean-up system 1 comprises a steam reforming unit (hydrogen reforming unit) 2 to produce hydrogen, a hydrogen storage unit 3 to absorb and release hydrogen, a fuel cell 4 to generate power, a gas clean-up unit 5 to clean up gas (exhaust gas) containing harmful substances, and a control unit 6 to control the hydrogen storage unit 3 to absorb and release hydrogen. The exhaust gas clean-up system 1 further comprises gas introduction piping 8 which connects an internal combustion engine 7 discharging exhaust gas and the steam reforming unit 2, gas passage piping 9 which connects the steam reforming unit 2, the hydrogen storage unit 3, the fuel cell 4 and the gas clean-up unit 5 to provide a desired gas passage, and gas discharge piping 10 to discharge cleaned-up exhaust gas from the gas clean-up unit 5. The exhaust gas clean-up system 1 further comprises a hydrogen permeable membrane 11 provided in the gas passage piping 9, between the steam reforming unit 2 and the hydrogen storage unit 3. The exhaust gas clean-up system 1 also comprises an air regulation valve 12 to regulate the amount of air drawn into the fuel cell 4.

The steam reforming unit 2 is formed of an ordinary hydrogen generator that can produce hydrogen from exhaust gas discharged from the internal combustion engine 7. Specifically, exhaust gas discharged from the internal combustion engine 7 contains harmful substances, such as carbon monoxide (CO), carbon hydride (HC) and nitrogen oxide ($NO_x$), and water vapor ($H_2O$), and the steam reforming unit 2 produces hydrogen, for example from carbon hydride (HC) and water vapor among these substances. For the catalyst to be used in the steam reforming unit 2, a metal catalyst, such as nickel carried on magnesium oxide, or ruthenium (Ru), may be used. The catalyst is not limited to the above-mentioned substances; other appropriate substances may be used according to characteristics of exhaust gas, such as composition and temperature.

The hydrogen storage unit 3 is formed of an ordinary hydrogen storage device comprising a hydrogen storage alloy capable of absorbing and releasing hydrogen. The alloys usable for the hydrogen storage alloy in the hydrogen storage unit 3 include Mg—Ti alloys, Fe—Ti alloys, Mg—Ni alloys, Mg—Y alloys and Mn—Ni alloys. The hydrogen storage unit 3 is configured to regulate temperature and pressure in a space in which the hydrogen storage alloy is arranged, so that hydrogen is absorbed or released by changing the temperature and pressure in that space according to a control signal (hydrogen absorption instruction or hydrogen release instruction) from the control unit 6. For example, the temperature may be regulated to 300° C. in order to absorb hydrogen as well as in order to release hydrogen. The hydrogen storage alloy is not limited to the above-mentioned alloys; other appropriate alloys may be used in view of the amount of hydrogen to be stored, the size of the hydrogen storage unit 3, etc.

For the fuel cell 4 which generates power using hydrogen supplied from the hydrogen storage unit 3, a PEFC (Polymer Electrolyte Fuel Cell), a PAFC (Phosphoric Acid Fuel Cell), an MCFC (Molten Carbonate Fuel Cell) or an SOFC (Solid Oxide Fuel Cell) may be used. For example, when the internal combustion engine 7 is an engine mounted on a vehicle, the fuel cell 4 is placed near the internal combustion engine 7 and affected by relatively high-temperature exhaust gas, so that the temperature around the fuel cell 4 becomes high. Accordingly, the SOFC, which has relatively high operating temperature, is preferable for the fuel cell 4. When ample space is available to install the exhaust gas clean-up system 1, influence of heat from the internal combustion engine 7 can be suppressed by distancing the fuel cell 4 from the internal combustion engine 7 or using heat insulating material, in which case, the temperature around the fuel cell 4 is low. Accordingly, other types of fuel cells can be used. In sum, for the fuel cell 4, an appropriate type of fuel cell may be selected depending on the environment in which the exhaust gas clean-up system 1 is installed, how ample space is available to install it, and the environment in which the fuel cell is placed.

For the gas clean-up unit 5, an exhaust gas converter can be used which can convert harmful substances in exhaust gas discharged from the internal combustion engine 7, such as carbon monoxide, carbon hydride and nitrogen oxide, into harmless substances, such as water, carbon dioxide and nitrogen. For example, an exhaust gas converter comprising a precious metal platinum as a three-way catalyst or an exhaust gas converter not using a three-way catalyst but comprising foamed nickel as a catalyst may be used. An appropriate type of exhaust gas converter may be selected in view of the required exhaust gas conversion efficiency, the cost and size of the converter, etc.

In this embodiment, in order to reduce costs by not using rare metals such as platinum, an exhaust gas converter comprising foamed nickel as a catalyst is used for the gas clean-up unit 5. Conversion of exhaust gas using foamed nickel requires hydrogen in order to enhance the catalytic effect of nickel. Thus, it is required that either hydrogen released from the hydrogen storage unit 3 be directly supplied to the gas clean-up unit 5 or hydrogen not used in the fuel cell 4 be supplied to it. The path of supply of hydrogen to the gas clean-up unit 5 will be described later.

In the exhaust gas converter comprising formed nickel as a catalyst, the exhaust gas which is to experience conversion needs to be at relatively high temperature, 400° C. or higher, for example. When the gas passage piping 9 is equipped with no special cooling function, the exhaust gas delivered from the steam reforming unit 2 to the gas clean-up unit 5 is at 400° C. or higher although it experiences a temperature drop before reaching the gas clean-up unit 5.

For the control unit 6, an ordinary controller may be used which can control the hydrogen storage unit 3 to switch between absorption and release of hydrogen and which can also control the amount of air supplied to the fuel cell 4. More specifically, the control unit 6 determines whether the fuel cell 4 is supplied with sufficient hydrogen, and if the hydrogen supply is deficient, changes the temperature and pressure settings for the space in which the hydrogen storage alloy is arranged to those for releasing hydrogen, thereby controlling the hydrogen storage unit 3 to cause hydrogen to be released from the hydrogen storage alloy. If the hydrogen supply to the fuel cell 4 is sufficient, the control unit changes the temperature and pressure settings for the space in which the hydrogen storage alloy is arranged to those for absorbing hydrogen, thereby controlling the hydrogen storage unit 3 to cause hydrogen to be absorbed into the hydrogen storage alloy. In order to determine whether the hydrogen supply to the fuel cell 4 is sufficient, a hydrogen sensor (not shown) may be provided at a connection between the fuel cell 4 and the gas passage piping 9 (i.e., a hydrogen inlet of the fuel cell 4) or within the fuel cell 4 to send a signal indicative of hydrogen quantity to the control unit to allow the control unit 6 to determine whether the hydrogen supply is sufficient.

Whether the hydrogen supply to the fuel cell 4 is sufficient may be determined in a manner other than the aforementioned direct measurement of hydrogen supply to the fuel cell 4. The supply of hydrogen may be determined to be deficient when the internal combustion engine 7 is at rest and determined to be sufficient when the internal combustion engine 7 is in operation. The reason supporting this manner of determination is as follows: when the internal combustion engine 7 is at rest, delivery of exhaust gas to the steam reforming unit 2 is stopped, so that the production of hydrogen is stopped, whereas when the internal combustion engine 7 is in operation, exhaust gas is delivered to the steam reforming unit 2, so that hydrogen is produced continuously. The control unit 6 also regulates the supply of air to the fuel cell 4 by controlling the position of the air regulating valve 12.

The internal combustion engine 7 is an ordinary engine which burns fuel in a cylinder to obtain power from thermal energy generated by combustion. The internal combustion engine 7 may be an ordinary engine mounted on a transportation means such as a vehicle, an airplane or a ship, or a stationary engine generator. In the present disclosure, in order to generate electricity using hydrogen, the internal combustion engine needs to be an engine which discharges exhaust gas serving as a source for hydrogen (containing carbon hydride, water vapor etc.). Instead of the internal combustion engine 7, an external combustion engine or a heat-treating plant which performs heat treatment such as carbonitriding may be connected to the gas introduction piping 8. The exhaust gas clean-up system according to the present disclosure is thus applicable to apparatus or equipment in which exhaust gas is discharged from a device other than an internal combustion engine.

The gas introduction piping 8, the gas passage piping 9 and the gas discharge piping 10 may be formed of pipes of a heat-resistant metal or the like to allow delivery of high-temperature gases. In order to allow the pipes to be shaped as desired, the pipes may be made of a metal or the like with high workability. For example, the pipes may be made of stainless steel.

For the hydrogen permeable membrane 11, a metal membrane may be used which allows only hydrogen produced by the steam reforming unit 2 to pass through it and does not allow gases other than hydrogen sent from the steam reforming unit 2 (residual gases) to pass through it. For example, a metal membrane comprising a high vanadium (V) content Fe—V alloy capped with platinum (Pt) or a metal membrane comprising a single layer film of vanadium (V) capped with palladium (Pd) may be used. Another type of hydrogen permeable metal membrane may be used.

As shown in FIG. 1, the gas passage piping 9 comprises a first passage 9a which connects the steam reforming unit 2 and the hydrogen storage unit 3, a second passage 9b which connects the hydrogen storage unit 3 and the fuel cell 4, a third passage 9c which connects the fuel cell 4 and the gas clean-up unit 5, a fourth passage 9d which connects the first passage 9a and the third passage 9c by bypassing the hydrogen storage unit 3 and the fuel cell 4, and a fifth passage 9e which connects the second passage 9b and the fourth passage 9d. In the present embodiment, hydrogen produced by the steam reforming unit 2 reaches the hydrogen storage unit 3 via the first passage 9a, passing through the hydrogen permeable membrane 11. Hydrogen not absorbed into the hydrogen storage unit 3 or released from the hydrogen storage unit 3 reaches the fuel cell 4 via the second passage 9b. Hydrogen not used in the fuel cell 4 reaches the gas clean-up unit 5 via the third passage 9c. In the present embodiment, as is understood from the above-described flow of hydrogen, a hydrogen delivery path comprises the internal combustion engine 7, located most upstream, the gas discharge piping 10, located most downstream, the first passage 9a, the hydrogen permeable membrane 11, the hydrogen storage unit 3, the second passage 9b, the fuel cell 4 and the third passage 9c. This configuration realizes a simplified path of hydrogen delivery, which contributes to reduction in cost of the exhaust gas clean-up system 1.

In the present embodiment, residual gases (i.e., exhaust gases other than hydrogen) sent from the steam reforming unit 2 cannot pass through the hydrogen permeable membrane 11 and thus do not reach the hydrogen storage unit 3; they are supplied to the gas clean-up unit 5 via part of the first passage 9a (section between the steam reforming unit 2 and the hydrogen permeable membrane 11), the fourth passage 9d and part of the third passage 9c. Thus, in the present embodiment, as understood from the above-described flow of residual gases, a residual gas delivery path comprises part of the first passage 9a, the fourth passage 9d and part of the third passage 9c. This configuration realizes a simplified path of residual gas delivery, which contributes to reduction in cost of the exhaust gas clean-up system 1.

In the present embodiment, the gas clean-up unit 5 needs to be supplied with a specified amount or greater of hydrogen. Thus, hydrogen is delivered from the hydrogen storage unit 3 to the gas clean-up unit 5 via part of the second passage 9b, the fifth passage 9e, part of the fourth passage 9d and part of the third passage 9c. In other words, part of hydrogen sent from the hydrogen storage unit 3 is supplied directly to the gas clean-up unit 5, bypassing the fuel cell 4. Thus, in the present embodiment, as understood from the above-described flow of hydrogen, a hydrogen supply bypassing path comprises part of the second passage 9b, the fifth passage 9e, part of the fourth passage 9d and part of the third passage 9c. In the present embodiment, the fifth passage 9e is connected to the fourth passage 9d, so that the hydrogen bypassing path joins the residual gas delivery path at the connection between the fifth and four passages, and thus, overlaps the residual gas delivery path.

Providing such hydrogen bypassing path allows a greater amount of hydrogen to be supplied to the gas clean-up unit 5, thereby allowing the gas clean-up unit 5 to enjoy lasting and enhanced catalytic effect. Further, providing such hydrogen bypassing path allows hydrogen and residual gases to share the passage, which contributes to reduction in cost of the exhaust gas clean-up system 1.

Although in the present embodiment, the hydrogen permeable membrane 11 is provided in the first passage 9a of the gas passage piping 9, it may be provided at the connection between the steam reforming unit 2 and the first passage 9a of the gas passage piping 9. In this case, in order to prevent exhaust gases other than hydrogen (residual gases) from staying in the steam reforming unit 2, it is necessary to provide an outlet for residual gases to the steam reforming unit 2 and connect it to the gas clean-up unit 5 by piping.

(Flow of Operations of the Exhaust Gas Clean-Up System Equipped with a Power Generating Function)

Figure 2:
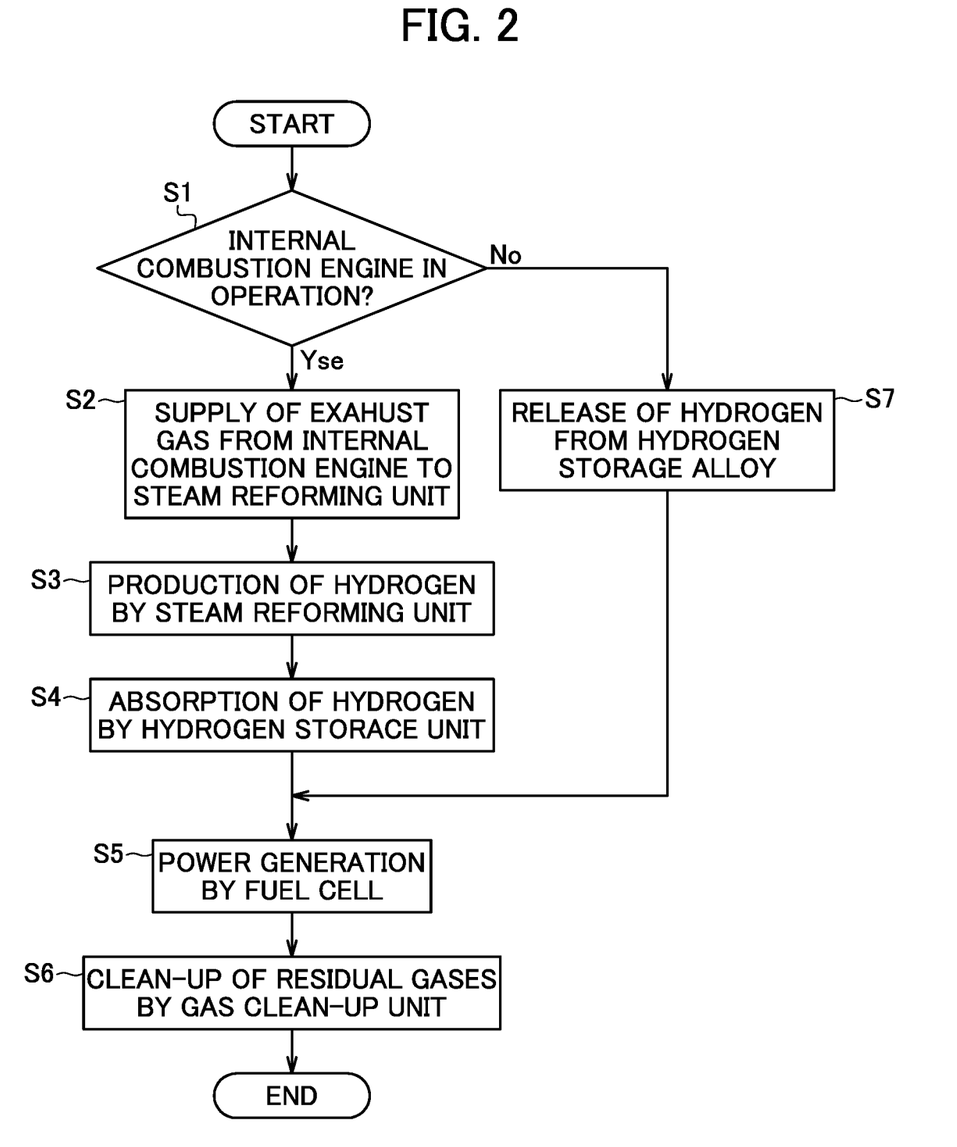
FIG. 2 is a flow chart for explaining flow of operations of the exhaust gas clean-up system equipped with a power generating function according to the embodiment.
Figure 3:
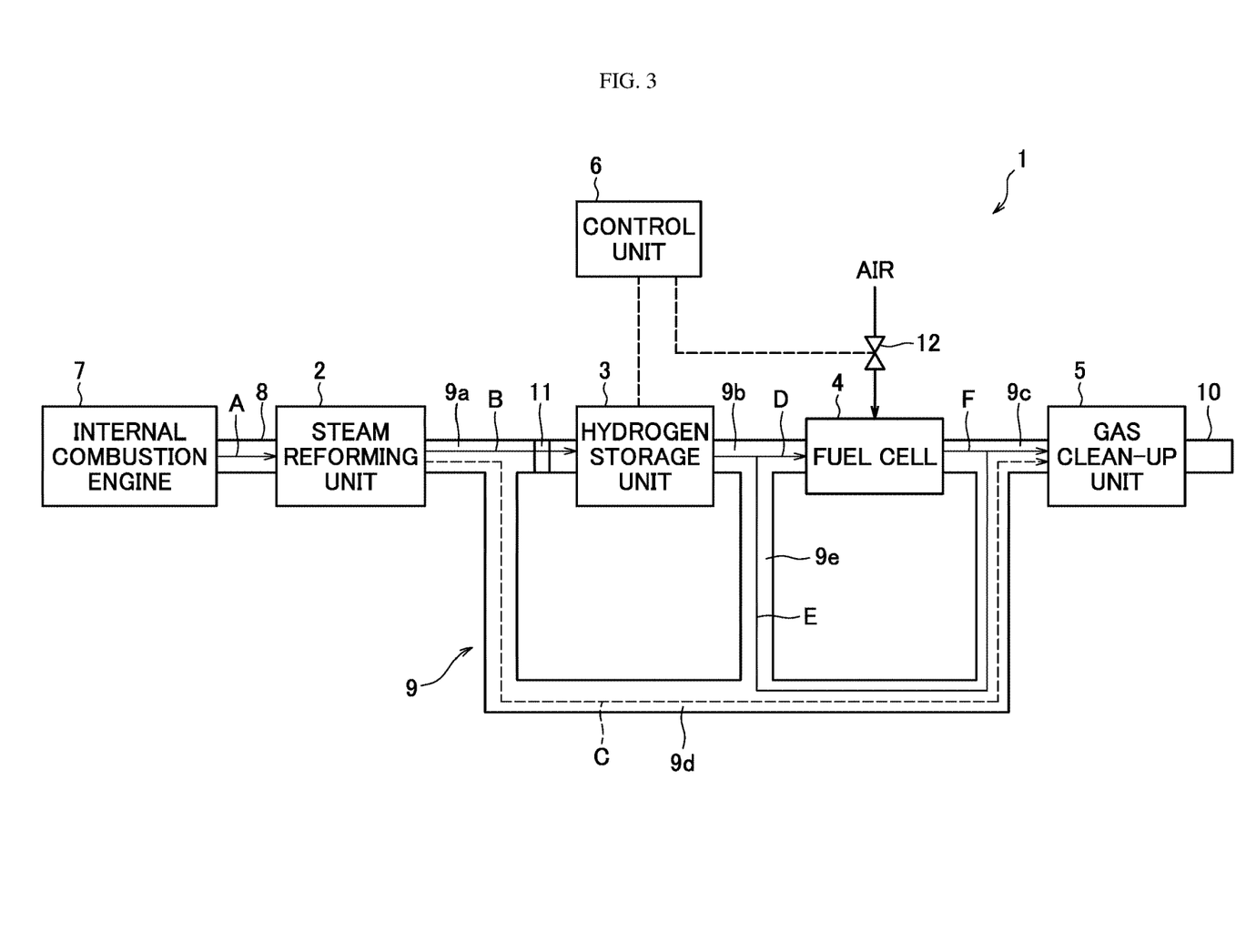
FIG. 3 is a schematic diagram for explaining flow of gases when the exhaust gas clean-up system equipped with a power generating function according to the embodiment is in operation.
Figure 4:
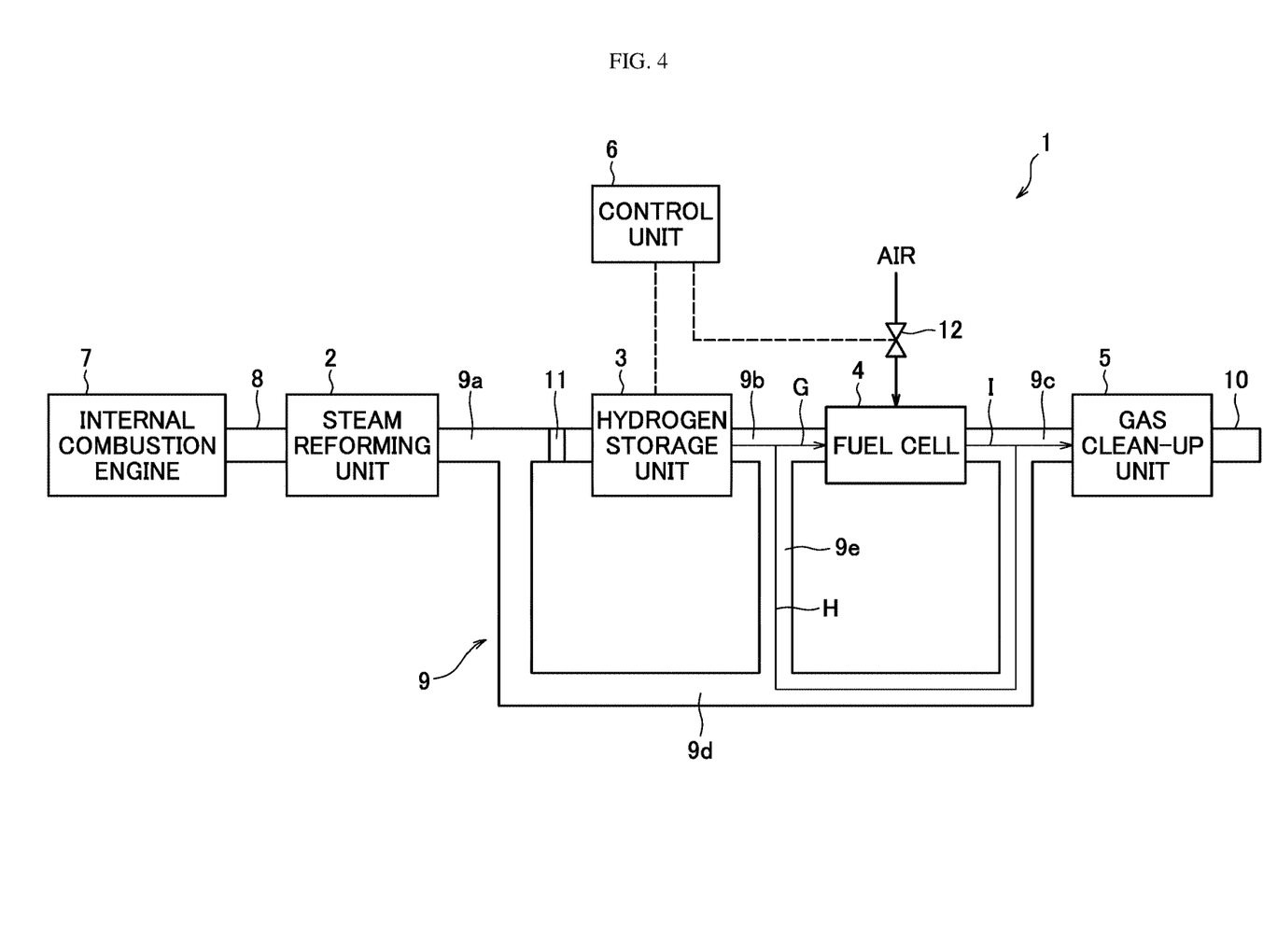
FIG. 4 is a schematic diagram for explaining flow of gases when the exhaust gas clean-up system equipped with a power generating function according to the embodiment is in operation.

Next, with reference to FIGS. 2 to 4, flow of operations of the exhaust gas clean-up system equipped with a power generating function 1 according to the present embodiment will be described. FIG. 2 is a flow chart for explaining flow of operations of the exhaust gas clean-up system equipped with a power generating function 1 according to the present embodiment. FIGS. 3 and 4 are schematic diagrams for explaining flow of gases when the exhaust gas clean-up system equipped with a power generating function 1 according to the present embodiment is in operation.

First, when the internal combustion engine 7 is in operation (YES at step S1), power is obtained by combustion in the internal combustion engine 7 but exhaust gas containing harmful substances is produced by combustion. The exhaust gas produced is delivered from the internal combustion engine 7 to the steam reforming unit 2 via the gas introduction piping 8 (step S2). In FIG. 3, this flow of exhaust gas is indicated by solid-line arrow A.

Next, in the steam reforming unit 2, hydrogen is produced from carbon hydride and water vapor contained in the introduced exhaust gas (step S3). The hydrogen produced is delivered to the hydrogen storage unit 3 via the first passage 9a of the gas passage piping 9, passing through the hydrogen permeable membrane 11. In FIG. 3, this flow of hydrogen is indicated by solid-line arrow B. Meanwhile, residual gases, or exhaust gases other than hydrogen, sent from the steam reforming unit 2 cannot pass through the hydrogen permeable membrane 11, and thus, reaches the gas clean-up unit 5 via part of the first passage 9a, the fourth passage 9d and part of the third passage 9c provided by the gas passage piping 9. In FIG. 3, this flow of residual gases (i.e., residual gas delivery path) is indicated by dashed-line arrow C.

Next, recognizing that the internal combustion engine 7 is in operation, the control unit 6 determines that the fuel cell 4 can generate power using hydrogen produced by the steam reforming unit 2 and controls the hydrogen storage unit 3 to cause hydrogen to be absorbed into the hydrogen storage alloy. In this situation, hydrogen passing through the hydrogen permeable membrane 11 and reaching the hydrogen storage unit 3 is absorbed into the hydrogen storage alloy (step S4). There is a limit to the amount of hydrogen that the hydrogen storage alloy can store, which is determined by the type of hydrogen storage alloy used and conditions (temperature and pressure). Thus, when hydrogen is supplied to the hydrogen storage unit 3 in the amount exceeding the limit, hydrogen not absorbed by the hydrogen storage unit 3 is sent to the second passage 9b of the gas passage piping 9. The hydrogen sent from the hydrogen storage unit is supplied to the fuel cell 4 via the second passage 9b and to the gas clean-up unit 5 via the fifth passage 9e and part of the fourth passage 9d (thus, bypassing the fuel cell 4). In FIG. 3, the flow of hydrogen supplied to the fuel cell 4 from the hydrogen storage unit 3 is indicated by solid-line arrow D, and the flow of hydrogen bypassing the fuel cell 4 is indicated by solid-line arrow E.

Next, the fuel cell 4 generates power using hydrogen supplied via the second passage 9b of the gas passage piping 9 and air supplied via the air regulation valve 12 (step S4). Here, the control unit 6 may regulate the air supply depending on the hydrogen supply to the fuel cell 4. This enhances the power generation efficiency of the fuel cell 4. Hydrogen not used in the fuel cell 4 is sent to the third passage 9c of the gas passage piping 9 and delivered to the gas clean-up unit 5. In FIG. 3, the flow of hydrogen delivered from the fuel cell 4 to the gas clean-up unit 5 is indicated by solid-line arrow F. In FIG. 3, solid-line arrows E and F indicate flows of hydrogen, respectively, although the arrows are united downstream of the connection between the third passage 9c and the fourth passage 9d.

Next, using the hydrogen supplied via the hydrogen supply paths indicated by solid-line arrows E and F as a catalytic reductant gas, the gas clean-up unit 5 cleans up the residual gases delivered via the residual gas delivery path indicated by dashed-line arrow C (step S6). The cleaned-up gas (gas containing no harmful substance) is discharged externally through the gas discharge piping 10.

By contrast, when the internal combustion engine 7 is at rest (NO at step S1), no exhaust gas is produced by the internal combustion engine 7. Since no exhaust gas serving as a source for hydrogen is supplied to the steam reforming unit 2, there is no hydrogen that is not stored and sent from the hydrogen storage unit 3, or in other words, the hydrogen storage unit cannot supply hydrogen to the fuel cell 4. In this situation, recognizing that the internal combustion engine 7 is at rest, the control unit 6 controls the hydrogen storage unit 3 to cause the hydrogen storage alloy to release absorbed hydrogen, in order to allow the fuel cell 4 to generate power continuously. Accordingly, the hydrogen storage unit 3 starts releasing hydrogen (step S7). The hydrogen released is supplied to the fuel cell 4 via the second passage 9b and to the gas clean-up unit 5 via the fifth passage 9e and part of the fourth passage 9d (thus, bypassing the fuel cell 4). In FIG. 4, the flow of hydrogen supplied from the hydrogen storage unit 3 to the fuel cell 4 is indicated by solid-line arrow G, and the flow of hydrogen bypassing the fuel cell 4 is indicated by solid-line arrow H.

Since the supply of hydrogen to the fuel cell 4 as well as to the gas clean-up unit 5 can be continued, power generation by the fuel cell 4 (step S5) as well as clean-up of the residual gases by the gas clean-up unit 5 can be continued. In sum, even while the internal combustion engine 7 is at rest, it is possible to generate power while cleaning up residual gases. In FIG. 4, the flow of hydrogen delivered from the fuel cell 4 to the gas clean-up unit 5 is indicated by solid-line arrow I.

Although in the above-described flow of operations, the hydrogen storage unit 3 is caused to switch between absorption and release of hydrogen depending on whether the internal combustion engine 7 is in operation or at rest, the hydrogen storage unit may be configured to release hydrogen when the power obtained from the internal combustion engine 7 (rpm, for example) is lower than or equal to a specified value. In that case, even when the rpm of the engine mounted on a vehicle or the like is so low (and thus, the amount of exhaust gas is so small) that the steam reforming unit 2 cannot produce an required amount of hydrogen, hydrogen is additionally supplied to the fuel cell 4 from the hydrogen storage unit 3, resulting in an increased power generation efficiency of the fuel cell 4.

As described above, the exhaust gas clean-up system equipped with a power generating function 1 according to the present embodiment, which comprises the steam reforming unit 2, the fuel cell 4 and the gas clean-up unit 5, can produce hydrogen from exhaust gas supplied and use it to generate power, and also clean up residual gases, or exhaust gases other than hydrogen. Providing the hydrogen storage unit 3 between the steam reforming unit 2 and the fuel cell 4 enables a required amount of hydrogen to be supplied from the hydrogen storage unit 3 to the fuel cell 4 anytime. In sum, the exhaust gas clean-up system equipped with a power generating function 1 according to the present embodiment can generate power by making effective use of exhaust gas and thermal energy, and enables continuous power generation, and enables continuous power generation, resulting in increased output of the fuel cell 4.

<Aspects of the Present Disclosure>

A first aspect of the present disclosure is an exhaust clean-up system equipped with a power generating function, comprising a steam reforming unit to produce hydrogen from exhaust gas supplied, a hydrogen permeable membrane to allow only hydrogen produced by the steam reforming unit to pass through it, a hydrogen storage unit to absorb hydrogen supplied through the hydrogen permeable membrane and release absorbed hydrogen, a fuel cell to generate power using hydrogen supplied from the hydrogen storage unit, a gas clean-up unit to clean up residual gases delivered not passing through the hydrogen permeable membrane, and a control unit to control the hydrogen storage unit to absorb or release hydrogen depending on whether the fuel cell is supplied with sufficient hydrogen.

The exhaust gas clean-up system equipped with a power generating function according to the present embodiment, which comprises the steam reforming unit, the fuel cell and the gas clean-up unit, can produce hydrogen from exhaust gas supplied and use it to generate power, and also clean up residual gases, or exhaust gases other than hydrogen. Providing the hydrogen storage unit between the steam reforming unit and the fuel cell enables a required amount of hydrogen to be supplied from the hydrogen storage unit to the fuel cell anytime. In sum, the exhaust gas clean-up system equipped with a power generating function according to the present disclosure can generate power by making effective use of exhaust gas and thermal energy, and enables continuous power generation, resulting in increased output of the fuel cell.

A second aspect of the present disclosure is an exhaust gas clean-up system equipped with a power generating function according to the first aspect which comprises a hydrogen delivery path extending from the hydrogen permeable membrane to the gas clean-up unit via the hydrogen storage unit and the fuel cell. This configuration realizes a simplified path of hydrogen delivery, which contributes to reduction in cost of the exhaust gas clean-up system.

A third aspect of the present disclosure is an exhaust gas clean-up system equipped with a power generating function according to the first or second aspect which comprises a residual gas delivery path extending from the steam reforming unit to the gas clean-up unit bypassing the hydrogen storage unit and the fuel cell. This configuration realizes a simplified path of residual gases, which contributes to reduction in cost of the exhaust gas clean-up system.

A fourth aspect of the present disclosure is an exhaust gas clean-up system equipped with a power generating function according to the third aspect which comprises a hydrogen supply bypassing path extending from the hydrogen storage unit to the gas clean-up unit bypassing the fuel cell. This configuration allows a greater amount of hydrogen to be supplied to the gas clean-up unit, thereby allowing the gas clean-up unit employing a gas clean-up method requiring hydrogen to enjoy lasting and enhanced catalytic effect.

A fifth aspect of the present disclosure is an exhaust gas clean-up system equipped with a power generating function according to the fourth aspect wherein the hydrogen supply bypassing joins the residual gas delivery path. This configuration allows a passage to be shared by flows of gas, which contributes to reduction in cost of the exhaust gas clean-up system.

EXPLANATION OF REFERENCE SIGNS

1 Exhaust gas clean-up system equipped with a power generating function
2 Steam reforming unit
3 Hydrogen storage unit
4 Fuel cell
5 Gas clean-up unit
6 Control unit
7 Internal combustion engine
8 Gas introduction piping
9 Gas passage piping
9a First passage
9b Second passage
9c Third passage
9d Fourth passage
9e Fifth passage
10 Gas discharge piping
11 Hydrogen permeable membrane
12 Air regulation valve

The invention claimed is:

1. An exhaust gas clean-up system equipped with a power generating function, comprising:
   a steam reforming unit to produce hydrogen from exhaust gas supplied,
   a hydrogen permeable membrane configured to allow only hydrogen produced by the steam reforming unit to pass through it,
   a hydrogen storage unit configured to absorb hydrogen supplied through the hydrogen permeable membrane and release absorbed hydrogen,
   a fuel cell configured to generate power using hydrogen supplied from the hydrogen storage unit,
   a gas clean-up unit configured to clean up residual gases not passing through the hydrogen permeable membrane,
   a control unit configured to control the hydrogen storage unit to absorb or release hydrogen depending on whether the fuel cell is supplied with an operative amount of hydrogen,
   a hydrogen delivery path extending from the hydrogen permeable membrane to the gas clean-up unit via the hydrogen storage unit and the fuel cell, and
   a residual gas delivery path extending from the steam reforming unit to the gas clean-up unit bypassing the hydrogen storage unit and the fuel cell.

2. The exhaust gas clean-up system equipped with a power generating function according to claim 1, comprising a hydrogen supply bypassing path extending from the hydrogen storage unit to the gas clean-up unit bypassing the fuel cell.

3. The exhaust gas clean-up system equipped with a power generating function according to claim 2, wherein the hydrogen supply bypassing path joins the residual gas delivery path.

* * * * *